Oct. 5, 1943.          C. B. SHILLINGER          2,331,053
INSULATOR PLUNGER SUPPORT
Filed Feb. 21, 1942          2 Sheets-Sheet 1
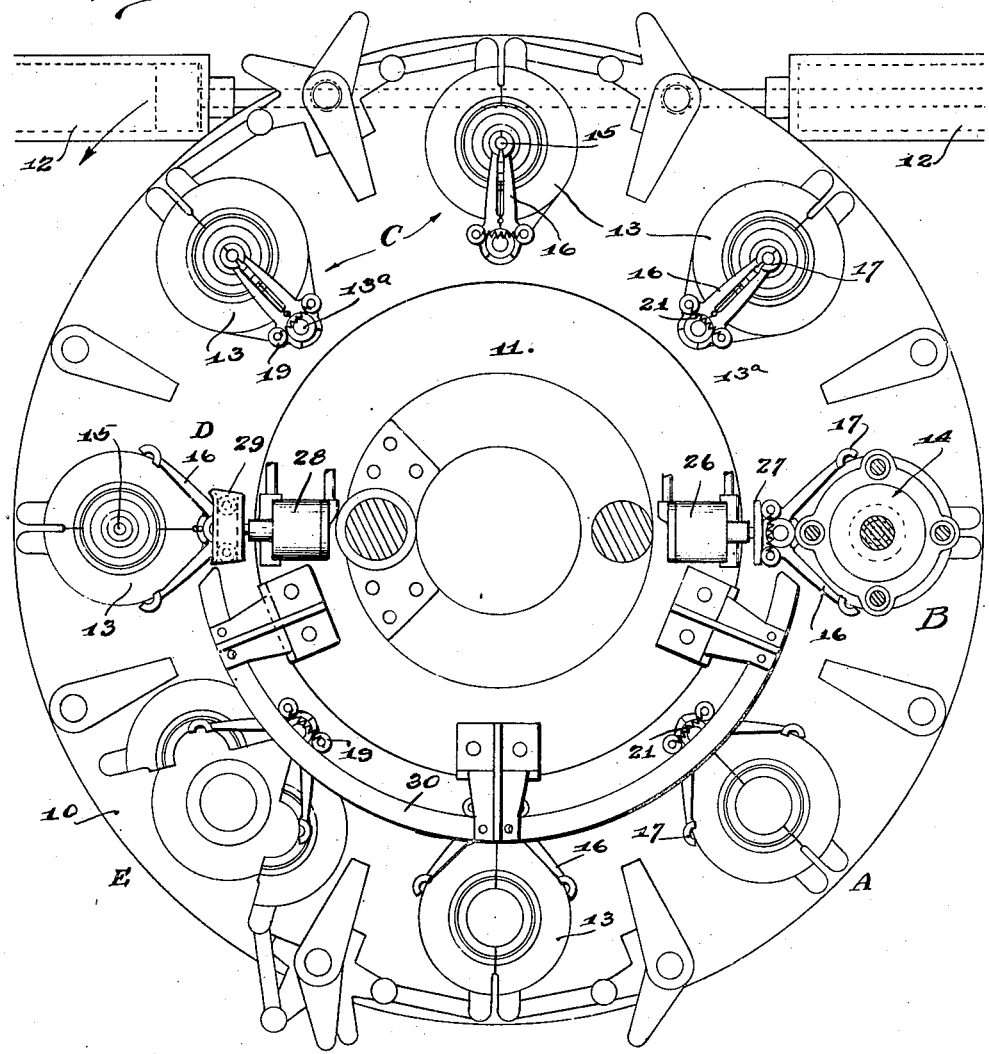
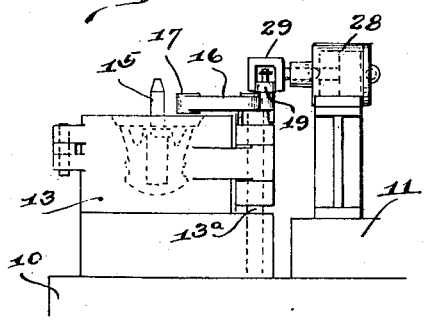
C. B. Shillinger
Inventor
By Rule & Hoge
Attorneys

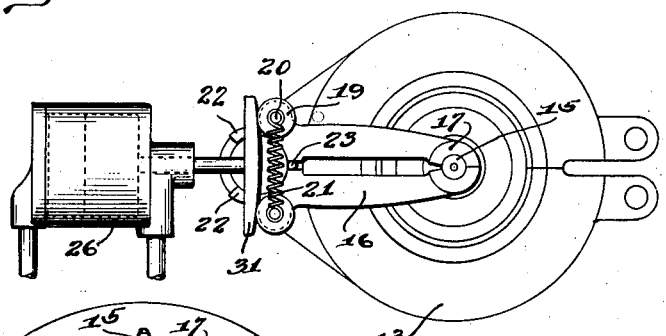
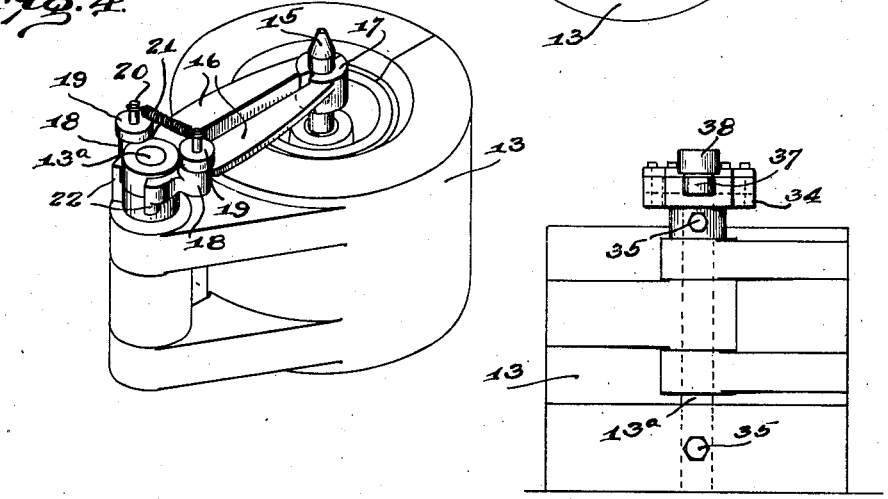
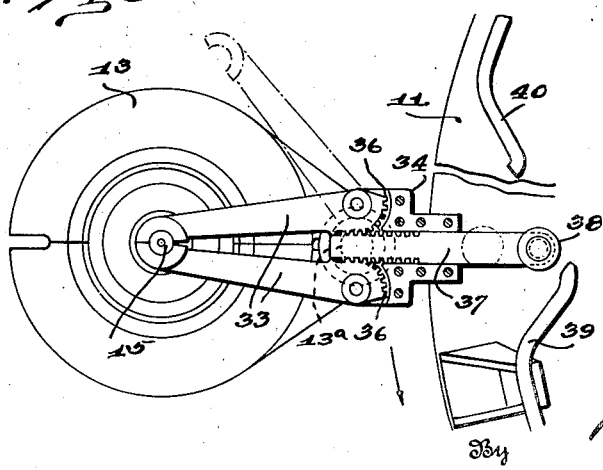

Patented Oct. 5, 1943

2,331,053

UNITED STATES PATENT OFFICE 2,331,053

INSULATOR PLUNGER SUPPORT

Clare B. Shillinger, Toledo, Ohio, assignor to Owens-Illinois Glass Company, a corporation of Ohio Application February 21, 1942, Serial No. 431,842

8 Claims. (Cl. 49—36)

The present invention relates to improvements in glassware forming machines and more particularly to machines adapted for pressing articles such as electric insulators in a mold.

Certain types of insulators are formed with an axial internally threaded cavity adapted for mounting on a threaded pin or other support. A machine usually employed in forming insulators of the above type generally comprises a rotatable table in which a series of press molds is mounted. A charge of molten glass is placed in the mold and a pressing plunger lowered thereinto. The plunger includes a removable threaded tip or mandrel which is pressed into the glass and which remains therein as the plunger body is withdrawn after the pressing operation. The tip is allowed to remain in the glass until the article is set or chilled sufficiently to permit removal of the tip by unthreading it without destroying the thread formation. Such a machine is illustrated in Patent 1,642,658 to M. K. Holmes, dated September 13, 1927, to which reference may be had for details of construction and operation.

The usual operating cycle includes rotating the mold table to bring the molds in succession past charging and pressing stations followed by a cooling period and then removal of the threaded plunger tip and finally the completed article. While the molds are progressing intermittently from the pressing station to the unthreading station, the plunger stem is permitted to stand unsupported in the semiplastic insulator, thus being subjected to the centrifugal force and vibration of the moving mold table. This often causes a distortion of the cavity resulting in the discarding of the misformed article.

The principal object of the present invention is to provide a simply constructed means for supporting the plunger tip between the pressing and unthreading stations.

A further object of the invention is to provide means operable upon rotation of the mold table for grasping and releasing the plunger tip.

Other objects and advantages will be in part apparent and in part pointed out hereinafter.

In the drawings:

Fig. 1 is a sectional plan view of an insulator molding machine of which my invention forms a part.

Fig. 2 is a side elevational view of a mold and apparatus attached thereto.

Fig. 3 is a plan view of the holding means.

Fig. 4 is a perspective view of the mechanism in closed position.

Fig. 5 is a plan view of a modified form of the invention.

Fig. 6 is a rear elevational view of the form shown in Fig. 5.

Referring to Figs. 1 and 2 of the drawings, the molding machine comprises generally a rotatable table 10 mounted on a base 11 and adapted to be driven in step by step motion by means of air motors 12 substantially as in the Holmes patent above referred to. A series of molds 13 mounted circumferentially on the table 10 is adapted to be brought during the cycle of operation in succession past a charging station A, pressing station B, chilling stations C, plunger tip removing station D and take-out station E. Each mold 13 comprises complementary half sections pivoted together on a vertical hinge pin 13a.

A charge of molten glass is deposited in the mold at the charging station A during a dwell period in the cycle of operation and the mold is then indexed to the pressing station. A pressing head 14 carrying a removable plunger tip 15 is lowered into the mold to completely form the glass and press the plunger tip thereinto.

The plunger tip is automatically released by the pressing head as the latter is raised from the mold and remains upright in the glass until the mold reaches the unthreading station D. The vibration and centrifugal force produced by the indexing motion of the mold table often causes the plunger to move out of vertical alignment with the mold, thereby displacing the glass around the tip of the plunger and thus distorting the cavity formed theerin. In order to prevent such distortion I have provided plunger supporting means which in the illustrated embodiment of my invention includes a pair of arms 16 pivoted together at one end on the hinge pin 13a and having matching cup-shaped jaws 17 on the opposite ends for gripping the shank of the plunger 15.

The arms 16 are each provided near the hinge connection, with outwardly extending complementary ears 18 which carry rollers 19 for engaging opening and closing mechanism to be described presently. Bearing pins 20 for each roller 19 extend upwardly therefrom and are connected by a coil spring 21 for holding the arms in either closed or open position as illustrated in Fig. 1. Stop lugs 22 (Figs. 3 and 4) on each arm hub limit the extent of opening of the arms. These arms are held in either position by the spring 21 as it moves with the ears and rollers to either side of dead center of the hinge pin. A stop pin 23 located on the mold opening center line in the top hinge section of the mold positively holds the arms in proper alignment with the plunger, thus preventing any side sway of the arms during stopping and starting of the machine.

Mechanism for closing the arms at the pressing station includes an air motor 26 (Fig. 1) having a pusher bar 27 which is adapted to engage the rollers 19 and thus simultaneously swing the arms 16 until the spring 21 passes the dead center of the hinge pin 13ª. The pusher bar further insures the positive closing of the arms under spring tension so that the plunger tip 15 will be securely supported. A valve (not shown) may be suitably mounted on the machine for operating the motor.

The jaws remain closed until the mold reaches the tip removing station D. Mechanism for opening the arms includes a second air motor 28 on which is mounted a downwardly facing channel member 29 adapted for reciprocating motion thereby. The channel is normally positioned in the path of the rollers 19 when they are in closed position and as the mold reaches the station D the rollers enter the inverted channel. The motor may then be operated by means of a suitable valve (not shown) which may be mounted on the machine. Withdrawal of the channel opens the arms so that the plunger tip can be removed without interference therefrom.

A stationary cam 30 extending between the closing and opening stations is positioned to engage the rollers and prevent the accidental closing or swinging of the arms.

Figs. 5 and 6 illustrate a modified form of the invention wherein a pair of plunger grasping arms 33 is pivoted in horizontal spaced relation within a housing 34. The housing is carried on the upper end of the mold hinge pin 13ª and secured in position by set screws 35. Sector gears 36 formed on the arms mesh with a rack bar 37 which is slidably mounted within the housing for simultaneous operation of both arms. A roller 38 carried by the bar, is adapted for engagement with an arm opening cam 39 and a closing cam 40 as shown in Fig. 5. The indexing motion of the mold table may be used to open and close the arms. The resulting effect of cam operation is substantially the same as that previously described for the use of air motors. The interval required for operation of the arms by cam is negligible and is not sufficient to create a distortion of the glass before the jaws grasp the plunger.

Modifications may be resorted to within the spirit and scope of the appended claims.

I claim:

1. In a glassware molding machine including a press mold, a rotatable table supporting said mold and adapted to bring it to charging, pressing, cooling, tip removing and takeout stations in succession, a removable tip for pressing an article in the mold and forming a recess in the article, said tip adapted to remain partially within the article during setting of the glass, a pair of jaws arranged over said mold for gripping and thereby supporting said tip during travel of the mold between said pressing and tip removing stations, means at said pressing station for closing said jaws, and means at the tip removing station for opening said jaws.

2. In a glassware molding machine including a series of hinged molds movable successively to and past a plurality of stations, an article pressing head at one station, a plunger tip insertable by said head into a mold to press a mold charge of glass therein and form a cavity in the finished article, means including a pair of coacting arms pivoted on said mold hinge and carrying jaws for engaging said tip while the latter is positioned in the article, and means at two of said stations for respectively closing and opening said arms.

3. In a glassware molding machine utilizing a a pressing plunger tip to press a charge of molten glass to its final shape and form a cavity therein and to be extracted from a finished article, a plurality of hinged molds movable successively to and past successive stations, a pair of separable arms arranged over each mold and adapted to engage and support the plunger tip after placement within the glass, and means at two of said stations for actuating said arms to alternately open and close them about said tip.

4. In a glassware molding machine including a series of hinged partible molds movable successively to and past a plurality of stations, an article pressing head at one station for inserting a plunger tip into a mold charge of glass in a mold, said tip adapted to be removed from the finished article, a pair of arms pivoted on the mold hinge, said arms adapted to swing over the mold, means for holding said arms together in closed position to thereby grasp and support the plunger tip, and means at two of said stations for alternately opening and closing said arms.

5. In a glassware molding machine including a series of hinged molds movable successively through a plurality of stations, an article pressing head at one station for inserting a plunger tip into a mold charge of glass in a mold, said tip adapted to be removed from the finished article, means mounted on said mold hinge for engaging said tip between certain of said stations, a housing secured to said mold hinge, a pair of complementary arms pivoted within the housing and adapted to swing over the mold, a rack bar for moving said arms to open or closed position, and a cam for moving said rack bar.

6. A glassware forming machine including an annular series of partible molds rotatable about a vertical axis, plunger tips adapted to be axially positioned in the molds to press molten glass to the form of a finished article and later to be removed therefrom, and separable jaws individual to the molds for releasably gripping the tips and supporting them against tilting.

7. A glassware forming machine including an annular series of partible molds rotatable about a vertical axis, plunger tips adapted to be axially positioned in the molds to press molten glass to the form of a finished article and later to be removed therefrom, separable jaws individual to the molds for releasably gripping the tips and supporting them against tilting, a pair of hinged arms carrying the separable jaws and means including a spring for holding the jaws either open or closed.

8. A glassware forming machine including an annular series of partible molds rotatable about a vertical axis, plunger tips adapted to be axially positioned in the molds to press molten glass to the form of a finished article and later to be removed therefrom, a pair of separable jaws individual to the molds for releasably gripping the tips and supporting them against tilting, arms carrying the jaws, a vertical hinge pin connecting the arms, and a spring connecting the arms in proximity to the hinge pin and movable past dead center of the latter incident to opening or closing of the arms to thereby hold said arms in either position.

CLARE B. SHILLINGER.